(12) United States Patent
Lang et al.

(10) Patent No.: US 12,260,589 B2
(45) Date of Patent: Mar. 25, 2025

(54) METHOD FOR VERIFYING AN INDIRECT VIEW SYSTEM

(71) Applicant: MEKRA Lang GmbH & Co. KG, Ergersheim (DE)

(72) Inventors: Werner Lang, Ergersheim (DE); Stefan Centmayer, Ergersheim (DE); Alexander Wotschal, Burgbernheim (DE)

(73) Assignee: MEKRA Lang GmbH & Co. KG, Ergersheim (DE)

( * ) Notice: Subject to any disclaimer, the term of this patent is extended or adjusted under 35 U.S.C. 154(b) by 143 days.

(21) Appl. No.: 17/196,654

(22) Filed: Mar. 9, 2021

(65) Prior Publication Data

US 2021/0287403 A1    Sep. 16, 2021

(30) Foreign Application Priority Data

Mar. 13, 2020  (DE) .................. 10 2020 107 016.0

(51) Int. Cl.
*G06T 7/80* (2017.01)
*G06T 7/73* (2017.01)
(Continued)

(52) U.S. Cl.
CPC ............... *G06T 7/80* (2017.01); *G06T 7/73* (2017.01); *H04N 17/002* (2013.01);
(Continued)

(58) Field of Classification Search
CPC ... G06T 7/80; G06T 7/73; G06T 2207/30252; G06T 2207/10; H04N 5/23299; H04N 5/247; H04N 5/2259; B60R 1/00
See application file for complete search history.

(56) References Cited

U.S. PATENT DOCUMENTS

| 5,850,254 A | 12/1998 | Takano et al. |
| 2012/0033854 A1* | 2/2012 | Jo .................. G06T 7/246 382/103 |

(Continued)

FOREIGN PATENT DOCUMENTS

| CN | 110383831 A | 10/2019 |
| DE | 102013214368 | 1/2015 |

(Continued)

OTHER PUBLICATIONS

Office Action dated Apr. 5, 2022 issued in Japanese Patent Application No. 2021-033462.
(Continued)

*Primary Examiner* — Kathleen V Nguyen
(74) *Attorney, Agent, or Firm* — COZEN O'CONNOR (57) ABSTRACT

Method for verifying indirect view system provides image capture unit (10) with image sensor (20), image processing unit (30), reproduction unit (40) and reference transducer (50) at a position at the vehicle (60), such that the reference transducer (50) lies in a recording portion of the image capture unit (10) and is depicted on the image sensor (20). The reference transducer (50) is defined at a reference transducer target position (51) on the image sensor (20). Image data of at least one recording portion (11) around the vehicle (60) are captured on sensor (20) and reproduced on unit (40). Then, a reference transducer current position (52) of the transducer (50) is determined on the image sensor (20) and the reference transducer current position (52) is compared with the reference transducer target position (51) to that extent whether reference transducer current position (52) is equal reference transducer target positon (51).

30 Claims, 4 Drawing Sheets

(51) Int. Cl.
*H04N 17/00* (2006.01)
*H04N 23/58* (2023.01)
*H04N 23/695* (2023.01)
*H04N 23/90* (2023.01)

(52) U.S. Cl.
CPC ........... *H04N 23/58* (2023.01); *H04N 23/695* (2023.01); *H04N 23/90* (2023.01); *G06T 2207/30252* (2013.01)

(56) References Cited

U.S. PATENT DOCUMENTS

| | | | |
|---|---|---|---|
| 2015/0009285 A1* | 1/2015 | Morishima | H04N 23/62 348/36 |
| 2016/0023603 A1* | 1/2016 | Vico | G06T 7/80 348/148 |
| 2016/0272163 A1* | 9/2016 | Dreiocker | H04N 23/811 |
| 2019/0253603 A1 | 8/2019 | Miyagaki et al. | |
| 2019/0279396 A1* | 9/2019 | Kunert | G06T 7/60 |
| 2019/0355151 A1* | 11/2019 | Hagenburg | G06T 7/70 |
| 2020/0250831 A1* | 8/2020 | Ishikawa | B66C 13/46 |

FOREIGN PATENT DOCUMENTS

| | | | | |
|---|---|---|---|---|
| DE | 10 2018 111 776 | | 11/2019 | |
| EP | 2 692 584 | | 2/2014 | |
| JP | 2014043121 | * | 3/2014 | |
| JP | 2018-082395 | | 5/2018 | |
| JP | 2018-201167 | | 12/2018 | |
| WO | WO 2017/174250 | | 10/2017 | |
| WO | WO-2017174250 A1 | * | 10/2017 | ............... B60R 1/00 |
| WO | WO 2021/043393 | | 3/2021 | |
| WO | WO-2021043393 A1 | * | 3/2021 | |

OTHER PUBLICATIONS

Chinese Office Action issued in corresponding application dated May 28, 2024.

* cited by examiner

METHOD FOR VERIFYING AN INDIRECT VIEW SYSTEM

BACKGROUND OF THE INVENTION

1. Field of the Invention

The present invention relates to a method for verifying an indirect view system, in particular a recording portion of an image capture unit or a read-out portion of an image sensor of the image capture unit, for a vehicle, in particular a passenger car or a commercial vehicle, an indirect view system which is configured for performing the method and a vehicle which comprises the indirect view system.

2. Description of the Related Art

In motor vehicles, it is legally prescribed to make so-called fields of view around a vehicle visible for the driver during driving operation. Which fields of view have to be visible is based on the type of the motor vehicle, such as motorcycles, motor vehicles for transporting passengers, motor vehicles for transporting goods, etc. The visibility of the fields of view has to be provided by a device for indirect view and the fields of view have to be visible for a driver, who sits on the driver's seat, all the time by using the device for indirect view. Depending on the type of the vehicle and in particular thereon, which areas around the vehicle can be directly seen by the driver, different legal prescriptions require that certain fields of view are permanently and reliably visible by using the device for indirect view. In Europe and some countries outside of Europe, the fields of view which have to be permanently reliably visible for a driver are defined in the UN/ECE-Regulation No. 46. Further relevant norms and regulations, respectively, include, for instance, the ISO 5721, ISO 5006, ISO 16505, ISO 14401 and the EU 167/2013. Besides the legally required fields of view, often further areas around the vehicle, so-called areas of view, are made visible by the device for indirect view. Areas of view may contain legally prescribed fields of view.

Commonly, the observation of the fields of view is possible with one or more mirrors. However, mirrors have some drawbacks. For instance, mirrors merely show objects to the driver which are on the same side of the mirror as the driver. Any object behind a mirror can only be shown in a difficult manner by this mirror. In addition, mirrors which are merely made from flat glass show the driver a small area, unless the mirrors are very close to the driver. If they are formed convexly, this produces an image distortion. Big vehicles typically have six or more mirrors which are mounted around the outside of the vehicle and the most of which are distorted and convex, which makes it difficult for the driver to pay attention to all relevant mirrors at the same time. Nevertheless, despite all of the mirrors, there are typically still blind spots in the areas of view around these vehicles, that is, the areas in which no fields of view are present.

In recent times, it is becoming increasingly common to consider using camera systems as devices for indirect view either in addition to or as a replacement for the mirrors as devices for indirect view. In such camera systems, an image is continuously captured and detected and processed, respectively, and stored, if so. The (video-) data captured by the image capture unit are transmitted, e.g., by using a supply unit and optionally after further processing, to a display device located in the driver's cabin. The display device depicts a view into the corresponding legally prescribed field of view or a plurality of fields of view and optionally supplemental information, such as, e.g., possible collision risks, distances to other objects, etc., for the area around the vehicle in a manner that the fields of view are permanently viewable at all times for the driver. At the same time, the view system offers a superior night vision, more flexible arrangement options and the opportunity to view larger areas of view with a reduced distortion.

Permanently viewable means in this context that the view into the field of view is depicted in a timely uninterrupted manner, i.e., not interrupted by alternatingly showing and hiding the fields of view or parts thereof or by overlaying other representations such that the field of view cannot be seen completely. Accordingly, the respective field of view or the fields of views are shown continuously and in real time on the display device. This holds at least for fields of view which have to be permanently visible for all vehicle conditions, in which the ignition switch is switched on and/or preferably, e.g., coupled to a sensor which receives a corresponding signal, such as a door opening signal or an ignition switch signal.

With camera systems as devices for indirect view, cameras and image capture units, respectively, are mounted on the vehicle body. The cameras and image capture units, respectively, capture at least a sideward portion of the vehicle environment which corresponds to the portion which would be seen by the driver looking in a common lateral rear mirror or front mirror. In particular, it is desired with commercial vehicles, to make a flat and horizontal part of the road surface with a particular width which extends from a defined distance behind the ocular points of the vehicle driver to the horizon viewable on each of the driver's side and the passenger's side. The width of this stripe corresponds, with using of common mirrors in a defined distance behind the ocular points of the driver, to the field of view of a wide angle mirror (for example, field of view IV as defined in the ECE R46), in a shorter distance behind the ocular points of the driver, to the field of view of a main mirror (for example, field of view II as defined in the ECE R46) whose predefined viewable width, i.e., the extension in the vehicle's lateral direction, is smaller than the width of the field of view of the wide angle mirror. The areas of a front mirror correspond, for example, to the field of view VI of UN/ECE R46.

In order to, in particular, reliably capture or record, respectively, the area of view of a common wide angle mirror with a camera and an image capture unit, respectively, cameras and image capture units, respectively, are often mounted in a certain distance to the vehicle body of the vehicle, such as at a distal end of a multipart and hinged camera arm which is characterized in that its longitudinal extension is significantly longer than its lateral extension. Further, it may be advantageous with regard to the capturing of required fields of view to mount such camera arms on positions on the vehicle body which differ from the usual positions on which common mirrors are mounted. Thus, it may arise that the camera is mounted to positions on the vehicle body which cannot be viewed by the driver during driving.

However, in particular with such multipart camera arms, it may arise that the camera—e.g. by collision of the camera arm with an object in the vehicle environment or by an external impact (displacement of the camera arm by interference by third parties)—is positioned relatively to vehicle such that one or more fixedly defined recording portions (such as the mentioned legally prescribed fields of view II and IV or one or more individually defined areas of view) are no longer or no longer completely shown. If this concerns solely a small deviation between the recording portions to be shown and the recording portions which are actually shown, it may arise that the driver, in particular if the driver is not familiar with the vehicle, does not recognize this deviation. Thus, he might realize possible dangerous situations, which are not or only insufficiently captured due to the deviation between the recording portion to be shown and the recording portion which is actually shown, too late or not at all which results in an increased risk of collision of the vehicle with other traffic participants or objects in the vehicle environment.

Actually, fields of view of cameras may only be verified and, if so, adjusted with a very extensive test setup. In this respect, reference targets are put up in a vehicle test stand between which the vehicle is positioned such that the reference targets have a fixed geometrical reference to the vehicle. The inaccuracy of the vehicle position and tolerances of the vehicle (e.g. component tolerances, different vehicle built-ups, measurements with and without driver, etc.) render an exact verification difficult and extensive. In particular, for smaller vehicle manufacturer, a complex verification process is practicable only hardly, since hereby high costs arise and the time slots increase as well. Further, for the driver, this is not realizable on his own or only with a very increased effort, e.g., if such a deviation arises during the operation of the vehicle. The same disadvantages also arise from repair and exchange processes, respectively, if image capture units are repaired or exchanged.

A method for determining mounting positions and/or orientations of several cameras of a camera system of a vehicle is known from WO 2017/174250 A1. A mirror replacement system for a vehicle is known from EP 2 692 584 A1. A calibration device and a method for determining calibration data is known from DE 10 2018 111 776 A1.

SUMMARY OF THE INVENTION

In view of this, it is an object of the present invention to provide a method for verifying an indirect view system of a vehicle which allows to recognize a deviation between a fixedly defined area to be shown on the reproduction unit and an area which is actually shown on the reproduction unit. In addition, it is an object of the invention to provide a corresponding view system.

This object is solved with a method for verifying an indirect view system for a vehicle, in particular a passenger car or a commercial vehicle, with the features according to claim 1, a view system for a vehicle, in particular a commercial vehicle, which can perform the method, with the features according to claim 15 and a vehicle, which uses the indirect view system, with the features according to claim 24. Preferred embodiments are given in the dependent claims.

The invention is based on the idea to reduce the effort which arises with a common verification of an indirect view system with an exact orientation of the reference targets relative to the vehicle. In particular, with the verification, either the recording portion of the image capture unit or the read-out portion of the image sensor of the image capture unit is verified. In this respect, according to the invention, the reference targets (outside the vehicle, in certain environments) are replaced by so-called reference transducers. The reference transducers are attached to the vehicle body. In this respect, at least one reference transducer is provided per vehicle side such that it lies in the recording portion of the image capture unit with switched-on image capture unit and is depicted accordingly on the image sensor of the image capture unit. The reference transducer, thereby, is depicted and defined, respectively, at a target position on the image sensor, if the recording portion corresponds to a target recording portion. The target position of the reference transducer on the image sensor corresponds to a position which the reference transducer must have at an ideal adjustment of the image capture unit in the recording portion of the image capture unit, such that the required and desired, respectively, fields of view are optimally shown to the driver. In other words, the target position of the reference transducer corresponds to a position on the image sensor in which the reference transducer is depicted at a best possible adjustment of the recording portion of the image capture unit on the image sensor, i.e., at an adjustment which completely fulfils the requirements to the viewability of the required and wished, respectively, fields of view.

With verification and testing, respectively, whether the indirect view system is adjusted such that its recording portion captures the vehicle environment as requested and wished, respectively, the vehicle environment is captured in form of image data by an image capture unit with an image sensor and the current position of the reference transducer on the image sensor is detected. The current position of the reference transducer on the image sensor corresponds to a position which the reference transducer actually has in the currently present adjustment of the image capture unit in the recording portion of the image capture unit. After detecting the current position of the reference transducer, the reference transducer current position is compared by the image processing unit or the driver with the reference transducer target position. In case of a deviation of the reference transducer current position from the reference transducer target position, either a deviation of the recording portion of the image capture unit or the read-out portion of the image sensor of the image capture unit from the ideal adjustment of the recording portion of the image capture unit and the read-out portion of the image sensor of the image capture unit, respectively, is existent. Thereby, possibly, an insufficient, e.g. incomplete, recording of the required and wished, respectively, fields of view can exist. If the reference transducer current position coincides with the reference transducer target position on the image sensor, no deviation of the recording portion or the read-out portion of the image capture unit from the ideal adjustment of the recording portion and the read-out portion, respectively, of the image capture unit is existent and the current recording portion of the image capture unit corresponds to the target recording portion of the image capture unit. The fields of view are shown as required and wished, respectively. The recording portion of the image capture unit corresponds to the portion of the vehicle environment which is captured by the image capture unit and is depicted on the image sensor. The read-out portion of the image sensor corresponds to the portion of the image sensor which is selected for reproduction on the reproduction unit and is taken out from the image sensor.

Besides the exact coincidence of the reference transducer current position and the reference transducer target position for definition of the ideal adjustment of the recording portion and the read-out portion of the image capture unit, also a location of the reference transducer current position in a defined portion around the reference transducer target position may be sufficient for a display of the field of view as required or wished. Thus, it is not compulsory necessary that the reference transducer target position and the reference transducer current position coincide exactly such that the wished and required, respectively, fields of view may be reliably displayed on the reproduction unit. The provision of a defined portion/area around the reference transducer current position may either occur on the image sensor or on the reproduction unit and serves for balancing/compensating of mechanical tolerances of the system or vehicle components or of inaccuracies during image recognition.

Such a method for verifying an indirect view system has the advantage that the fixed geometric reference between the reference target and the vehicle may be realized in a simple manner by attaching of the reference transducer directly to the vehicle body without a laborious test setup with mobile reference targets. Furthermore, by means of the method according to the invention, it is no longer necessary to examine/check the vehicle in a suitable examination environment, such as a workshop. Rather, the method may be performed independently on the location of the vehicle, preferably occasionally repeatedly and also preferably during the operation of the view system, either automatically (e.g. in fixed time intervals) or if required (e.g. if the driver wishes). This reduces not only the necessary equipment for the requested test setup, but is also time-saving with regard to the installation of the test setup and the examination/checking itself and, thus, results in an uninterrupted and, thus, economic operation of the indirect view system.

Preferably, the reference transducer target position has a fixed geometric relation to at least one of the target fields of view captured by the image capture unit. The target field of view may be a legally prescribed field of view such as defined in the UN/ECE R46, or may be a field of view which is defined by the manufacturer and user, respectively, and, thus, is a wished field of view. A fixed geometric relation between the reference transducer target position and the target field of view ensures that the reference transducer is positioned in the recording portion of the image capture unit such that the prescribed or wished field of view is shown, if the reference transducer current position coincides with the reference transducer target position. In this respect, the prescribed or wished field of view is dependent on the type of the vehicle and its geometry.

According to a preferred embodiment, at least the reference transducer current position is depicted on the reproduction unit and the comparison occurs on the reproduction unit. Preferably, the comparison of the reference transducer current position and the reference transducer target position occurs on the reproduction unit by manually applying a mask, such as, for example, a foil, or depicting a digital overlay with a fixed reference transducer target position. Thereby, a user, such as, for example, a production associate, applies a mask on which the reference transducer target position is indicated on the reproduction unit and compares whether the reference transducer current position is covered on the reproduction unit by the reference transducer target position on the mask. In case of no coverage, the user recognizes in an easy manner that the recording portion of the image capture unit is displaced or that the read-out portion of the image sensor is displaced and that the requested or wished fields of view possibly are no longer completely shown. In case of a coverage, however, the user recognizes in an easy manner that the recording portion of the image capture unit or the read-out portion of the image sensor is adjusted as requested or wished. It is also conceivable to display both the reference transducer current position and the reference transducer target position on the reproduction unit. So, it may be quickly and reliably recognized by the user, without applying a mask, that the recording portion of the image capture unit or the read-out portion of the image sensor is displaced and that the requested or wished fields of view are possibly no longer shown completely. Both the depiction of the reference transducer current position and the reference transducer target position on the reproduction unit may occasionally even occur during driving of the vehicle.

Preferably, the comparison occurs in the image processing unit, e.g., by a certain computing algorithm and a computer program, respectively, for comparing the reference transducer current position with the reference transducer target position which is stored in the image processing unit. The computer program may be a graphic program or an image recognition program. With a graphic program, for example, an overlay may be projected onto the image sensor such that the image processing unit may recognize whether the reference transducer current position coincides with the reference transducer target position. Alternatively, the examination/checking of a coincidence of the reference transducer current position and the reference transducer target position may be performed by means of image recognition, wherein the image captured by the image capture unit is segmented and the separate image segments are analysed by pattern recognition/pattern matching. The comparison of the reference transducer current position and the reference transducer target position by the image processing unit has the advantage that the comparison may be performed repeatedly during the operation of the indirect view system and even during driving of the vehicle, uncoupled of an action of the user, which allows a more reliable and more certain comparison and increases the operational safety of the vehicle, since it may be quickly recognized if the current and target positions no longer coincide.

Preferably, with the method, not only the reference transducer current position and the reference transducer target position are compared with each other, but it is also at the same examined, whether the current field of view which is displayed on the image sensor and, thus, on the reproduction unit is the requested or wished field of view, that is the target field of view. The comparison of the current field of view and the target field of view occurs preferably by position examination, that is by comparing certain points associated with a target field of view with points of the current field of view. So, it may be determined in an easy manner whether the image capture unit is in operating position or a fixedly defined position. For example, in case of a multipart and hinged camera arm, which may be folded by collision with an obstacle or by an external impact by third parties, rotatively, such as, for example, in defined irregular or regular time intervals (e.g. once a day, once a week or another time interval) or after detection of particular vehicle states (ignition ON/OFF, engine start, coupling of a trailer, changing image adjustments, etc.) it may be examined whether the camera arm is displaced in view of the ideal orientation or not or whether the camera arm is located at a predetermined position, such as a folding position, parking position, etc., or not. Therefore, no separate position switch and folding sensor is required in the camera arm for examining/checking the viewability of the field of view. The additional comparison of positions of fields of view can either be performed always or preferably on demand, for example, if the vehicle is located in a corresponding test device with a reference field of view display.

Preferably, the comparison of the reference transducer current position and the reference transducer target position occurs in the image processing unit in at least an image analysing portion of the image sensor. The image analysing portion corresponds to a part of the entire image sensor which the image processing unit uses during applying the computer program for comparing the reference transducer current position and the reference transducer target position. The analysis of a certain part of the image sensor compared to the analysis of the entire image sensor saves computing power and computing time. However, it is also conceivable to analyse, i.e. to consider, the entire image sensor during comparing the reference transducer current position with the reference transducer target position.

Preferably, the image read-out portion comprises an image analysing portion. The image read-out portion is the portion of the image sensor which is shown to the driver on the reproduction unit. According to an embodiment of the invention, the image read-out portion is larger than the image analysing portion. According to a further preferred embodiment, the image read-out portion does not comprise the image analysing portion, i.e. the image analysing portion is located on the image sensor in another position than the image read-out portion.

Preferably, the method comprises the additional step of putting-out a signal to the driver if the reference transducer current position is unequal to the reference transducer target position. The signal may be an acoustic, optic and/or haptic signal and may preferably be repeatedly shown to the driver. An acoustic signal may be one or more of an audio warning and an alert, respectively, a voicemail, etc. An optic signal may be one or more of an optical warning notice, such as, for example, a red triangle with exclamation point, on the reproduction unit, in the car dashboard, in a head-up display, etc. The optical warning notice may occur repeatedly, such as a blinking, or can be shown constantly. A haptic signal may be a vibration of the steering wheel. Various combinations of acoustic, optic and/or haptic signals are conceivable. By the signal(s), the driver may timely, i.e. without noticeable time delay, recognize that the recording portion of the image capture unit or the read-out portion of the image sensor has changed.

According to a preferred embodiment, the method may comprise the additional step of performing a calibration action, if the reference transducer current position is unequal to the reference transducer target position. A calibration action is necessary, if the reference transducer current position is unequal to the reference transducer target position, in order to bring the wished field of view again into coincidence with the target field of view. A calibration action means an adjustment and correction, respectively, of a recording portion of the image capture unit or a read-out portion of the image sensor of the image capture unit, such that the image capture unit captures the required and wished fields of view and such that these are shown accordingly on the image sensor and the reproduction unit. By calibrating, the recording portion and the read-out portion of the image capture unit cannot only be verified, i.e. cannot be checked for correctness, but the recording portion and the read-out portion may also be corrected, if required.

The output of a signal and the performing of a calibration action may occur separately from each other or in combination. That is, it is conceivable that a signal is put out, in order to point out to the driver or the production associate a deviation of the reference transducer current position and the reference transducer target position, however without correcting the deviation. Alternatively, no signal may be put out to the driver or the production associate, but directly after determination of a deviation between the reference transducer current position and the reference transducer target position, a correction of the deviation occurs. Further alternatively, the processes of the signal output and the correction may also occur directly subsequent.

Preferably, the calibration action comprises the adjusting (calibrating) of the recording portion of the image capture unit or the read-out portion of the image sensor, such that the reference transducer current position is equal to the reference transducer target position, i.e., that the reference transducer current position coincides with the reference transducer target position on the image sensor, i.e. that the reference transducer current position and the reference transducer target position have the same position on the image sensor. So, it can be ensured that the driver may reliably view into the vehicle environment.

Preferably, the adjusting of the recording portion of the image capture unit or the read-out portion of the image sensor occurs manually or electrically by aligning at least one part of the image capture unit and/or digitally by adapting the at least one image read-out portion on the image sensor. Thereby, the orienting of the at least one part of the image capture unit may occur manually, e.g., by displacing of adjustment screws of the image capture unit at the body of the vehicle or of a supporting structure supporting the capture unit. Another example is the displacing of the supporting structure and parts of the supporting structure, respectively, relatively to each other. Alternatively, the orienting may also occur by adhering the capture unit in a suitable position and posture, respectively, on the body of the vehicle or a supporting structure supporting the capture unit. Further alternatively or additionally, the orienting of the at least one part of the image capture unit may occur electrically, such as, for example, by using a servo motor, which, for example, automatically displaces the optic of the image capture unit. The orienting of the image read-out portion may occur manually by means of a corresponding input medium, such as a joystick, a touchscreen, a door control module, input buttons at the monitor, etc., or may automatically occur by a calibration program which is stored in the image processing unit. Alternatively or additionally, the adaptation of the at least one image read-out portion may occur digitally by changing the image read-out portion on the image sensor such that the reference transducer current position coincides with the reference transducer target position. For example, this may occur by displacing the read-out portion on the image sensor pixel by pixel.

The calibration action occurs by a signal received in the image processing unit. Preferably, the signal may be received during the operation of the indirect view system. The signal may be a manual input of the user, such as, for example, the driver or a production associate, or may be put out by means of a software in a clocked manner (time interval, pattern) or by defined vehicle functions (ignition ON/OFF, engine start, coupling of a trailer, changing image adjustments, etc.).

The target field of view is preferably a legally prescribed field of view. For example, the target field of view corresponds to one of the fields of view which are defined in the UN/ECE R46, e.g., the field of view of group II or IV. Legally prescribed fields of view have a fixed relation to the ocular point of the driver as it is defined in the UN/ECE R46. Thus, in this case, there exists also a fixed geometric relation between the ocular point of the driver and the reference transducer which further increases the reliability that the driver actually views into the field of view which he should view into.

Preferably, the indirect view system is a mirror replacement system which completely replaces legally prescribed vehicle mirrors.

According to a further aspect of the invention, an indirect view system of a vehicle is configured such that it may perform the above described method. The indirect view system comprises at least one image capture unit with an image sensor which is configured for recording image data of at least one recording portion around the vehicle, at least one image processing unit which is configured for processing the image data captured by the image capture unit, and at least one reproduction unit which is configured for reproducing the image data processed by the image processing unit. Further, the indirect view system comprises at least one reference transducer which is configured such that it is attachable to a defined position at the vehicle and, in a state of the indirect view system mounted to the vehicle, lies in a recording portion of the image capture unit and is displayed on the image sensor, wherein the reference transducer is displayed at the reference transducer target position on the image sensor. Furthermore, the indirect view system comprises at least one verification unit which is configured for defining a reference transducer target position and for determining a reference transducer current position on the image sensor.

As image capture unit, any digital image capture units come into consideration which have an image sensor and which are suitable to record/capture the vehicle environment in form of image data, such as, for example, cameras with a CMOS or CCD technology. As image processing unit, any control unit (ECU) comes into consideration which is suitable for putting out and receiving signals and commands. Thereby, the image processing unit may comprise a single image processing module or a plurality of image processing modules which are either arranged in the view system in one position or at different positions or which are completely or partly positioned in the vehicle as well. As reproduction unit, any monitor, any display, etc. comes into consideration which is suitable for showing the image data recorded by the image processing unit, such as a TFT monitor, a LCD monitor, etc.

Preferably, the view system further comprises a calibration unit which is configured for performing a calibration action. Thus, with the indirect view system, it is not only possible to determine whether the reference transducer current position coincides with the reference transducer target position or not, but it is also possible, in case of a deviation between the reference transducer current position and the reference transducer target position, to correct the deviation and, thus, to adjust the recording portion of the image capture unit or the read-out portion of the image sensor such that the reference transducer current position and the reference transducer target position on the image sensor and, thus, also on the reproduction unit coincide, i.e., lie at the same position or at least in a defined area around the reference transducer target position.

Preferably, the reference transducer comprises a geometric pattern. For example, the reference transducer may be a crossline, a triangle, a circle, if so, monochrome or polychrome, which can be attached to the vehicle body at a suitable location. Alternatively or additionally, the reference transducer may also be part of the vehicle body, especially the vehicle contour, which has a special shape for recognition by means of image recognition. For example, the reference transducer may correspond to an edge at the rear of the vehicle, such as, for example, the driver's cabin or the built-up. Alternatively, the reference transducer may also be a wheel of the vehicle or a flashlight signal of the turning indicator. Alternatively, the special shape may also be recognized by a user on the reproduction unit.

Alternatively or additionally, the reference transducer may be configured for reflecting light. For example, the reference transducer may be a reflector, if so, as adhesive label/sticker, or may comprise reflection tapes/ribbons. Thereby, the reference transducer can also be recognized in dark vehicle environments with the presence of light sources in the vehicle environment on the image sensor or on the reproduction unit.

Alternatively, the reference transducer may be a light source itself. For example, the reference transducer may be an LED, an IR lamp, a laser, a light bulb, etc. Thus, the reference transducer can also be recognized in darkness, such as at night, in a tunnel or at bad weather conditions, on the image sensor or on the reproduction unit, even if no further light source is present in the vehicle environment. Thereby, the light source can either shine permanently, blink or may switch on only with the presence of a particular event, such as with switching on the ignition, coupling of a trailer, etc. or maybe manually switched on by a user (e.g. a driver or production associate).

Preferably, the light source may be a lamp which exists at the vehicle, such as, for example, a vehicle boundary lamp, a circumference lamp, a rear lamp, an entry lamp, a signal indicator, etc. Even lamps at the vehicle may be used as reference transducer which do not shine towards the image capture unit, but notwithstanding lie in the recording portion of the image capture unit, such as for example a boundary lamp at a rear portion of the vehicle or the driver's cabin or the vehicle built-up. In this case, an opening has to be provided in the lamp housing through which the light is transmitted towards the image capture unit.

With using a light source as reference transducer, the light source may further advantageously be configured for identifying a pollution of the optics of the image capture unit on the reproduction unit. By illuminating the optics of the image capture unit, such as, for instance, the lens, a foreign particle, if a foreign particle is located on the optical element, is well recognizably depicted on the image sensor, i.e., more clearly than without an additional lighting. By illuminating the foreign particle, a high contrast and accentuated depiction, respectively, of the foreign particle is generated directly on the image sensor and, thus, an alleged pollution of the optic may either be identified automatically on the image sensor by image recognition or may be shown to the driver on the reproduction unit.

Preferably, the view system comprises at least two capture units. Each capture unit is associated with a respective reference transducer. Alternatively, one common reference transducer is associated with the capture units.

According to a preferred embodiment, the view system is a mirror replacement system.

According to a further aspect, a vehicle is provided with the above described view system, wherein the image capture unit is arranged in a holding element which extends distally from the vehicle. The holding element may be a camera arm which is characterized in that it has a substantially larger extension in the longitudinal direction than in the lateral direction. Preferably, the image capture unit is arranged at an end of the camera arm distally from the vehicle, in order to capture the vehicle environment in a suitable manner. The vehicle is preferably a passenger car or a commercial vehicle. As commercial vehicle, a truck comes into consideration which has a driver's cabin and a built-up which is preferably rigid, such as a metal built-up. Alternatively, a truck with a driver's cabin and a trailer may be comprised by the term "vehicle", too.

Preferably, the vehicle is a commercial vehicle and the reference transducer is arranged at an outer side of the vehicle driver's cabin. Alternatively, the reference transducer may also be attached to a side surface of the vehicle or the reference transducer may be attached to a front surface of the vehicle. This is in particular advantageous if the ECE/UN R46 is applied. Further alternatively, the reference transducer may be attached to a vehicle built-up of the vehicle, e.g., a box body or a side board wall.

The reference transducer may be directly attached to the vehicle or may be attached to the vehicle by means of a reference transducer supporting element. The supporting element may be a component which protrudes from the vehicle in its mounted state, whose end distal of the vehicle is provided with the reference transducer, such as adhered or screwed thereto.

According to a preferred embodiment, the reference transducer is releasably connected with the vehicle. In this respect, the reference transducer is attached temporarily only for the calibration action and will be removed afterwards, such as, for example, by means of a magnetic base, a screw-on, a hang-up connection, etc. Alternatively, the reference transducer may also be non-releasably connected to the vehicle such that it is permanently present at the vehicle, such as, for example, by an adhesive label/sticker, a painting or a respective varnishing, a vehicle lamp, a separate component, a vehicle reference with contrast to the environment, such as, for example, the rear edge of the driver's cabin, the wheel house, etc.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the following, the invention will be described exemplarily based on the accompanying figures, in which.

DETAILED DESCRIPTION OF THE PRESENTLY PREFERRED EMBODIMENTS

Figure 1:
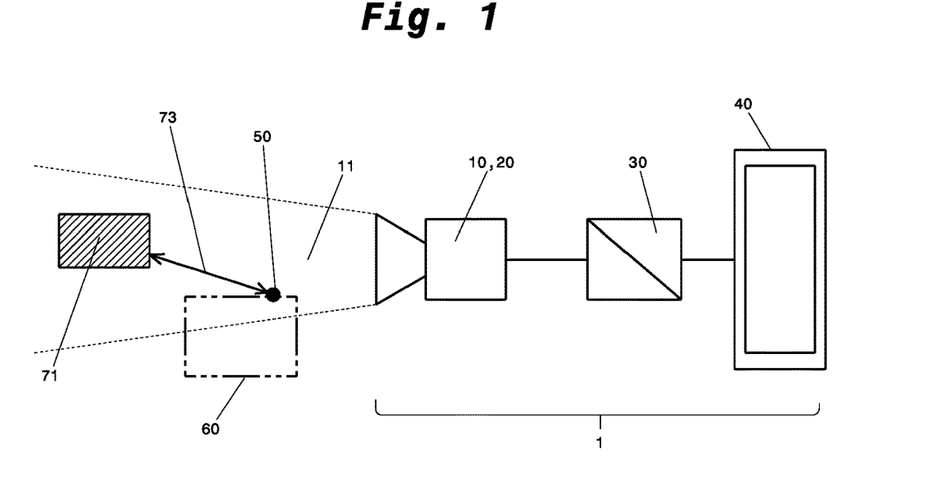
FIG. 1 shows a schematic structure of a view system which can perform the method according to the invention.

FIG. 1 shows a schematic view of an indirect view system 1 which can perform the method according to the invention. The view system 1 comprises an image capture unit 10, such as a camera, with an image sensor 20, an image processing unit 30, such as an ECU, and a reproduction unit 40, such as a monitor. The view system 1 shown in FIG. 1 is shown in an ideal vehicle environment in which a vehicle 60 (see rectangular which is shown with a two dots dashed line) and a target field of view 71 associated with the vehicle 60 (see hatched rectangular) is to be seen. An ideal vehicle environment presently means that the target field of view 71 is shown to a driver (not shown) of the vehicle 60 as required on the reproduction unit 40. The forward driving direction of the vehicle 60 shown in FIG. 1 runs in FIG. 1 to the right, the rearward driving direction runs in FIG. 1 to the left. The capture unit 10 has a recording portion 11 which, starting at the camera 10, flares and expands, respectively, to the rear side of the vehicle 60.

Further, the view system 1 comprises a reference transducer 50. The reference transducer 50 is attached in FIG. 1 to a left outer side of a schematically shown vehicle 60.

The target field of view 71 is arranged obliquely behind the vehicle of a left side of the vehicle 60 and may be a legally required field of view, such as a field of view of group II or IV, as required in the UN/ECE R46. The target field of view 71 as shown in FIG. 1 has a fixed geometric reference 73 to the reference transducer 50. That is, the arrangement of the target field of view 71 with reference to the reference transducer 50 is known and is also always unaltered in the ideal vehicle environment.

Figure 2:
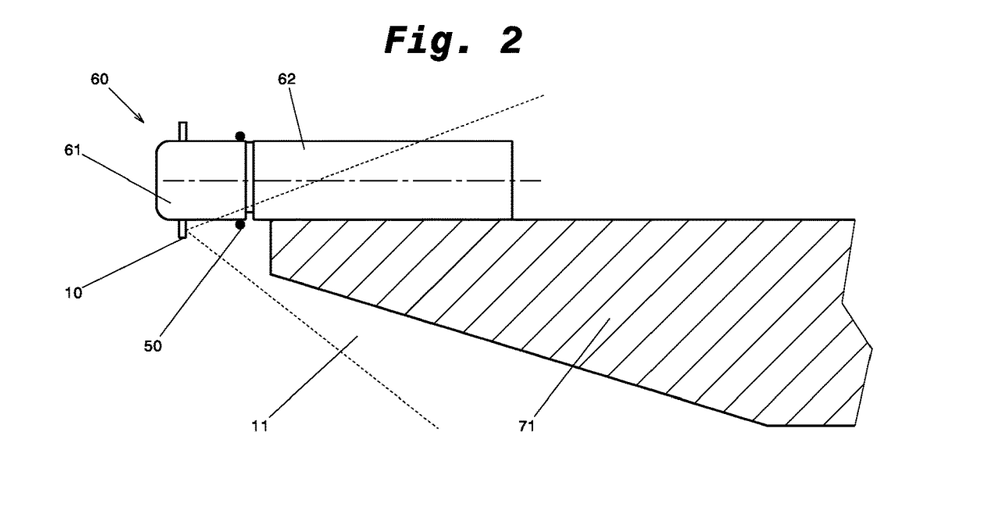
FIG. 2 shows a plan view of the vehicle with an image capture unit and a target field of view.

FIG. 2 shows a plan view of a vehicle 60, presently a truck. The vehicle 60 has a driver's cabin 61 and a vehicle built-up 62 (e.g. a tipper, a cooler, a box body, a car transporter etc.). The forward driving direction of the truck 60 runs in FIG. 2 to the left, whereas the rearward driving direction of the truck 60 runs in FIG. 2 to the right. The following description of the vehicle environment on the left side of the truck 60 also holds for the right side of the truck 60, even if not shown.

The truck has at the left side of the traction machine, in particular the driver's cabin, an image capture unit 10. The image capture unit 10 captures the vehicle environment left alongside and behind the truck 60 and has a recording portion 11 which expands in a horizontal plane which is parallel to the road surface from the image capture unit 10 to the rear of the truck 60. The recording portion 11 of the image capture unit 10, thus, is named recording cone 11.

Left alongside/next to the truck 60, the target field of view 71 schematically shown in FIG. 1 is arranged. The target field of view 71 extends in a predetermined distance behind the ocular point of the driver (not shown) to the rear of the truck 60 and expands in a particular angle to the rear. Presently, the target field of view 71 corresponds to the field of view II of UN/ECE R46, i.e., a main mirror field of view. However, the target field of view may also correspond to any other field of view, either a legally required field of view or a wished field of view, i.e., a field of view predetermined by the manufacturer or user.

At a rear edge of the driver's cabin 61 of the truck 60, the reference transducer 50 shown in FIG. 1 is arranged. As shown in FIG. 2, the reference transducer 50 is located in the recording cone 11 of the image capture unit 60. The reference transducer 50 may also be attached to the vehicle built-up 62, provided that the built-up is a rigid built-up.

Figure 3:
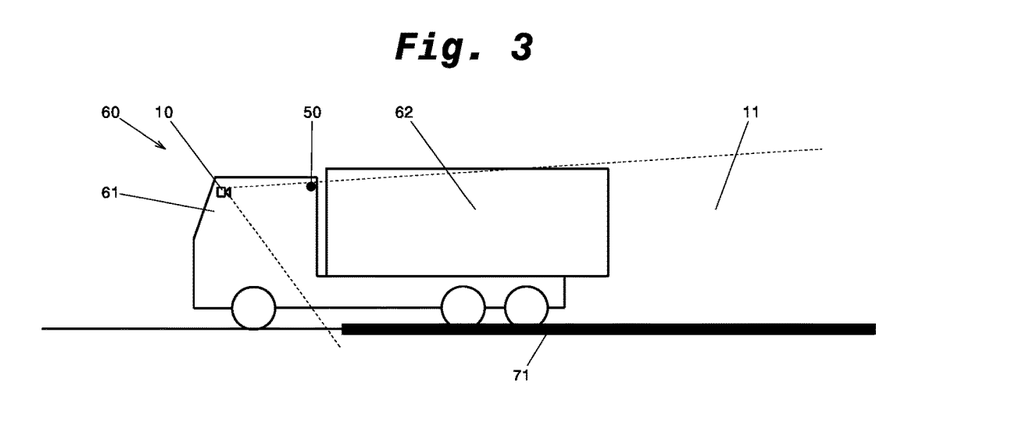
FIG. 3 shows a side view of a vehicle with an image capture unit and a target field of view.

FIG. 3 shows the vehicle environment of FIG. 2 in a side view. As shown in FIG. 3, the recording portion 11 of the image capture unit 10 does not only expand in a horizontal plane which is parallel to the road surface from the image capture unit 10 to the rear of the truck 60, but also expands to the rear in a plane which is orthogonal to the road surface and parallel to the left truck vehicle outer wall. The target field of view 71 is shown in FIG. 3 as big black line in the plane of the road surface. As further shown in FIG. 3, the reference transducer is arranged in an upper rear left corner of the traction machine of the truck 60 and is captured by the recording cone 11 of the image capture unit 10.

Figure 4:
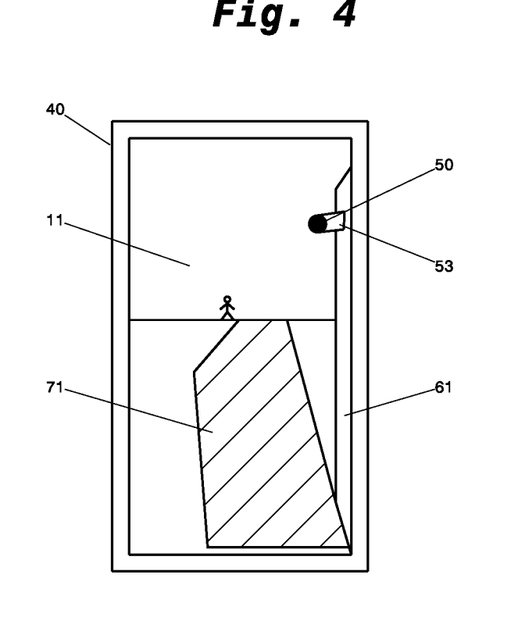
FIG. 4 shows a reproduction unit which shows the vehicle environment shown in FIGS. 2 and 3.

FIG. 4 shows the reproduction unit 40 shown in FIG. 1. In FIG. 4, the reproduction unit 40 shows the ideal vehicle environment shown in FIGS. 2 and 3. The person schematically depicted in FIG. 4 is not shown in FIGS. 2 and 3. In FIG. 4, for sake of clearness, only the traction machine of FIGS. 2 and 3 is depicted. As it can be taken from FIG. 4, the reference transducer 50 is arranged at the traction machine of the truck 60 via a reference transducer supporting element 53. Specifically, the reference transducer 50 is attached to an end of the reference transducer supporting element 53 protruding from the traction machine of the truck 60 which end is distal from the vehicle. The reference transducer 50 may be a light reflecting element or a lamp which emits light to the front of the truck 60.

Figure 5:
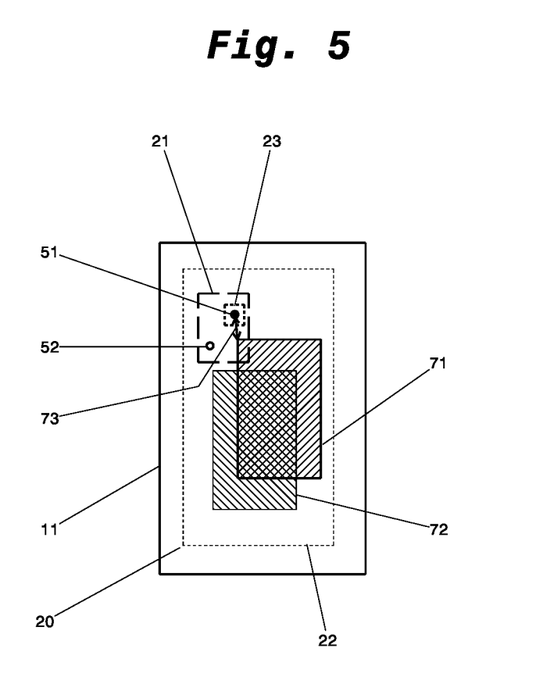
FIG. 5 shows an image sensor on which a reference transducer current position and a reference transducer target position as well as a current field of view and a target field of view are shown.

FIG. 5 shows an image sensor 20 as it is present in the image capture unit 10 shown in FIG. 1 and schematically shows a verification process which is performed by the image processing unit 30 and wherein a verification of the recording portion 11 of the image capture unit 10 or a read-out portion 22 of the image sensor occurs by comparing a reference transducer current position 52 and a reference transducer target position 51 on the image sensor 20.

The image sensor 20 has a rectangular shape with a longer extension in the up-and-down-extension than in the left-and-right-extension in FIG. 5. On the image sensor 20, the entire vehicle environment located in the recording cone 11 is depicted. A part of the image data shown on the image sensor 20 is read out as an image read-out portion 22 (see rectangular with fine dashed line) and is transmitted to the reproduction unit 40 for displaying. It is also possible to transmit the image data of the entire image sensor 20 to the reproduction unit 40 for displaying.

In a left upper corner of the image read-out portion 22, an image analysis portion 21 is arranged (see rectangular with roughly dashed line). In the image analysis portion 21, a reference transducer target position 51 is indicated. The reference transducer target position 51 on the image sensor 20 corresponds to the position on the image sensor 20 at which the reference transducer 50 should be depicted, if the recording portion 11 of the image capture unit 10 is located in the required and wished adjustment, respectively. In the required and wished adjustment of the recording portion 11 of the image capture unit 10, respectively, the driver sees the required and wished vehicle environment, respectively, on the reproduction unit 40, such as, for example, the required and wished target field of view 71, respectively.

In the image analysis portion 21, further, a reference transducer current position 52 is depicted. The reference transducer current position 52 on the image sensor 20 corresponds to the position on the image sensor 20 where the reference transducer 50 is actually depicted, if the image capture unit 10 captures the vehicle environment. As shown in FIG. 5, the reference transducer current position 52 does not lie in the same position as the reference transducer target position 51. As the reference transducer target position 51 has a fixed geometric relation 73 to the target field of view 71, a current field of view 72 is also shown in a displaced manner in view of the target field of view 71 on the image sensor 20 of the image capture unit 10, and, in this case, the driver can only partly see/view into the required and wished vehicle environment, respectively (see overlapping portion of the target field of view 71 and the current field of view 72 in FIG. 5), on the reproduction unit 40.

The deviation of the reference transducer current position 52 and the reference transducer target position 51 on the image sensor 20 is detected in the embodiment shown in FIG. 5 by a suitable computer program stored in the image processing unit 30, such as, e.g. by image recognition, and is shown to the driver by an audio warning or a corresponding display on the reproduction unit 40 or the dashboard. Then, for example, the driver may correct the deviation of the reference transducer current position 52 to the reference transducer target position 51 manually by adjusting the image capture unit 10 such that the reference transducer current position 52 is equal to the reference transducer target position 51. In a further or an alternative step to the output of a signal, however, the image processing unit 30 may also correct the error in the depiction on the image sensor, i.e., that the reference transducer current position 52 is unequal to the reference transducer target position 51, on its own and, thus, may calibrate the indirect view system. A calibration of the recording portion 11 of the image capture unit 10 may occur automatically by the image processing unit 30. In general, the determination whether the reference transducer current position 52 is equal to the reference transducer target position 51 is started either upon a signal, such as a corresponding command of the driver, upon a vehicle event or by a corresponding calibration program. A vehicle event may be the starting of the vehicle, the switching on of the ignition, the coupling of a trailer, etc. A calibration program performs a determination of the reference transducer current position 52 by means of a corresponding software in a clocked manner, compares the reference transducer current position 52 with the reference transducer target position 51 and corrects the reference transducer current position 52 autonomously such that it coincides with the reference transducer target position 51.

As it is further shown in FIG. 5, a reference transducer target portion 23 is defined around the reference transducer target position 51. The reference transducer target portion 23 defines an area on the image sensor 11 in which the reference transducer 50 has to be located at least, in order to be able to capture the required and wished fields of view, respectively, with the image capture unit 10, to depict them on the image sensor 11 and to show them on the reproduction unit 40. The reference transducer target portion 23 is defined in advance by the vehicle manufacturer or the view system manufacturer and usually comprises a portion which is symmetrical around the reference transducer target position 51. A non-symmetric extension of the reference transducer target portion 23 around the reference transducer target position 51 is also conceivable. Therefore, it may also be sufficient that the reference transducer current position 52 is displaced into the reference transducer target portion 23, in order to calibrate the view system 1, but does not have to exactly lie on the reference transducer target position 51.

Figure 6:
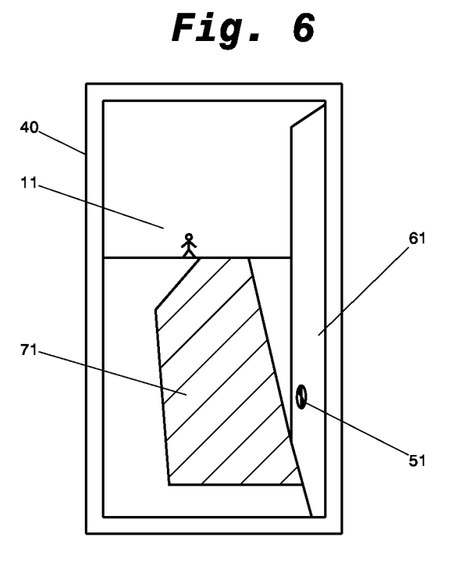
FIG. 6 shows a reproduction unit which shows the vehicle environment shown in FIGS. 2 and 3 with a reference transducer at a vehicle side surface.

In FIG. 6, the reproduction unit 40 is shown whose display corresponds substantially to the display of the reproduction unit of FIG. 4. However, in FIG. 6, a reference transducer 50 is shown which is attached to a lower rear right corner of the driver's cabin 61 of the truck 60. The reference transducer 50 in FIG. 4 is a kind of crossline which is attached to the driver's cabin outer wall. For example, the reference transducer 50 may be a permanent adhesive label/sticker or may be attached during vanishing the truck 60 at the driver's cabin outer wall. The reference transducer, thus, is permanently attached to the driver's cabin outer wall. Alternatively, however, the reference transducer 50 may also be a (releasable) adhesive label/sticker, may be attachable via a magnetic base to the driver's cabin/truck outer wall or may be configured otherwise releasably from the driver's cabin/truck outer wall such that it is fixed only on demand, i.e. for a planned verification and, if so, calibration of the indirect view system 1, to the body of the truck. Furthermore, the reference transducer may be attached to all imaginable and suitable locations at the body of the truck 60, however, may also be attached to a fixedly defined part of a vehicle built-up, such as, for example, a box body. Alternatively, special shapes of the vehicle body of the truck (e.g., the wheel, the rear edge of the driver's cabin 61 or the built-up 62) may form the reference transducer 50 itself.

FIG. 7 shows again the reproduction unit 40 of FIG. 4 and a verification process which is performed by the image processing unit 30 and wherein a verification of the recording portion 11 of the image capture unit 10 occurs by comparison of a reference transducer current position 52 and a reference transducer target position 51 on the reproduction unit 40, e.g. either digitally by an overlay or manually by applying a foil on each of which the reference transducer target position is defined. The overlay and the foil, respectively, correspond presently to the verification unit.

Figure 7:
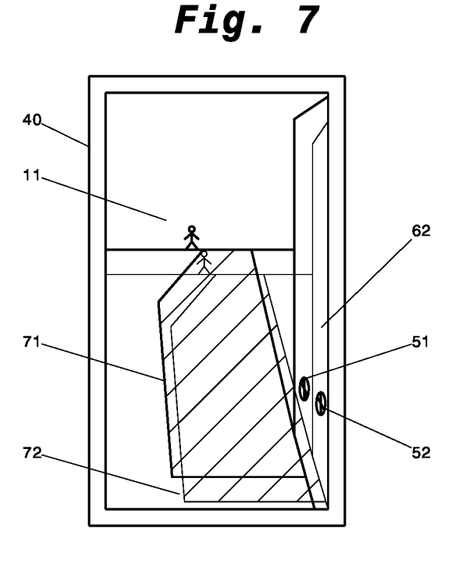
FIG. 7 shows a reproduction unit which shows the vehicle environment shown in FIG. 6 with a reference transducer respectively arranged in a target position and in a current position and a corresponding current field of view and target field of view.

While in FIG. 6 only the target situation is shown on the reproduction unit 40, in FIG. 7, the target situation and the current situation are shown on the reproduction unit 40. Specifically, it is shown in FIG. 6 that the reference transducer 50 is located in the target situation at the reference transducer target position 51 and in the current situation at the reference transducer current position 52. With a reference transducer current position 52 which is displaced in view of the reference transducer target position 51, also the current field of view 72 is displaced in view of the target field of view 71.

The deviation of the reference transducer current position 52 and the reference transducer target position 51 on the image sensor 20 is detected in the embodiment shown in FIG. 6 by a suitable computer program which is stored in the image processing unit 30, such as, for example, by image recognition, and is shown to the driver on the reproduction unit 40 by laying the target situation over the current situation. If so, the display of the current situation deviating from the target situation can be shown to the driver on the reproduction 40 also by an additional signal, such as by an audio warning or a corresponding display on the reproduction unit 40 or the dashboard. Then, for example, the driver may correct the deviation of the reference transducer current position 52 to the reference transducer target position 51 manually by adjusting the image capture unit 10, such that the reference transducer current position 52 is equal to the reference transducer target position 51. In a further or alternative step to the signal output, however, the image processing unit 30 may also correct the error in the depiction on the image sensor, i.e. that the reference transducer current position 52 is unequal to the reference transducer target position 51, on its own by means of a suitable calibration program and, thus, may calibrate the indirect view system.

A calibration of the recording portion 11 of the image capture unit 10 by the image processing unit 30 may occur automatically. In general, the determination whether the reference transducer current position 52 is equal to the reference transducer target position 51 is either started upon a signal, such as a corresponding command of the driver, upon a vehicle event or upon a corresponding calibration program. A vehicle event may be the starting of the vehicle, the switching on of the ignition, the coupling of a trailer, etc. A calibration program performs a determination of the reference transducer current position 52 by means of a corresponding software in a clocked manner, compares the reference transducer current position 52 with the reference transducer target position 51 and corrects the reference transducer current position 52 on its own such that it coincides with the reference transducer target position 51.

While it is shown in FIG. 6 that the reference transducer 50 is arranged at the rear portion of the driver's cabin 61, FIG. 7 shows that the reference transducer 50 is arranged at a rear portion of a built-up 62 of the truck 60.

Figure 8:
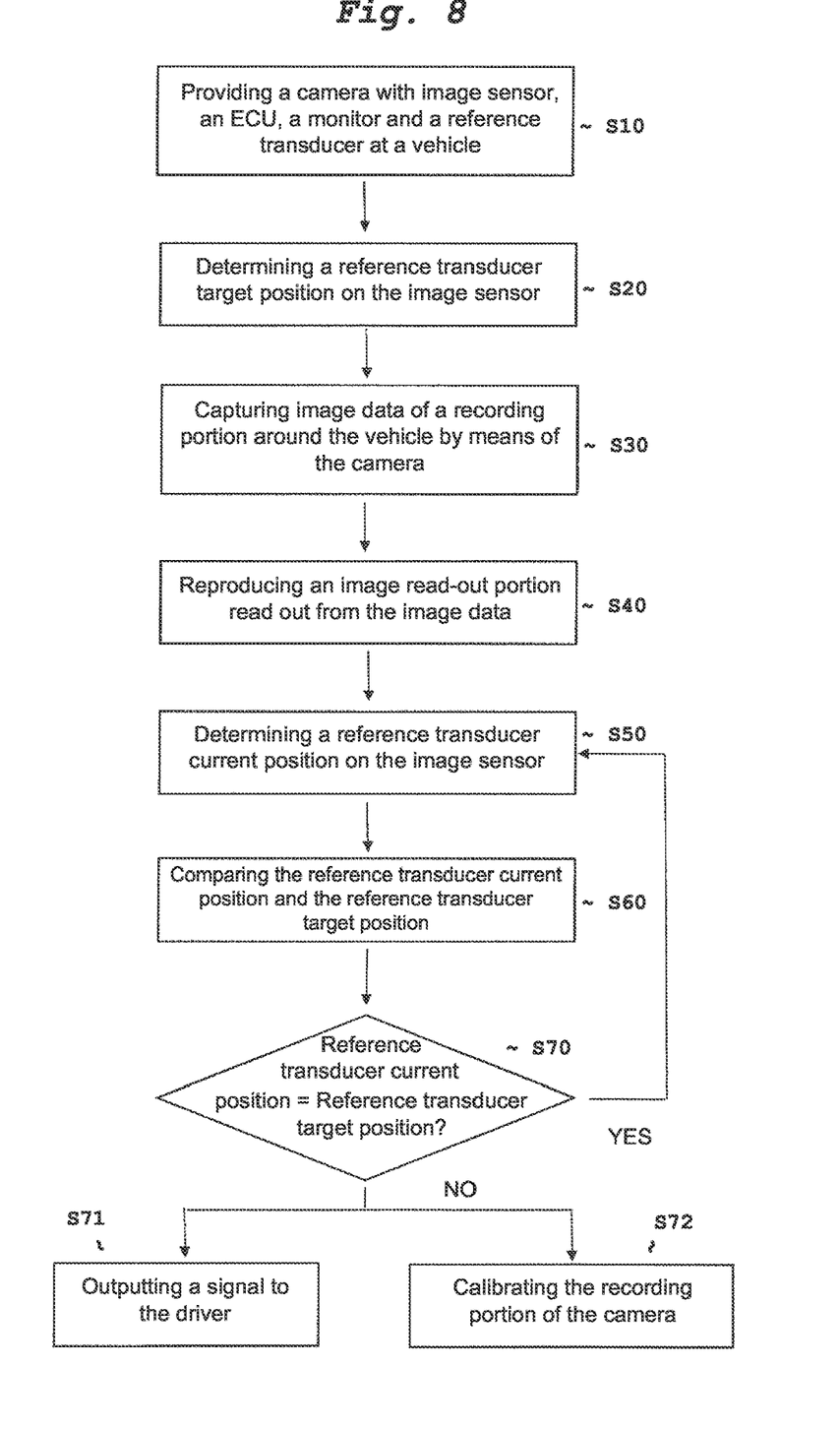
FIG. 8 shows a flow diagram which comprises the essential steps of the method for verifying and calibrating, respectively, an indirect view system according to the invention.

In FIG. 8, a flow diagram is shown which describes the verification process and calibration process, respectively. In step S10, an image capture unit 10 which has at least one image sensor 20 and is configured for capturing image data of at least one recording portion 11 around the truck, an ECU as image processing unit 30 which is configured for processing the image data captured by the image capture unit 10, and a monitor as reproduction unit 40 which is configured for reproducing the image data processed by the image processing unit 30, are provided. Further, in step S10, a reference transducer is provided which is arranged at a defined position at the truck 60 such that the reference transducer 50 lies in a recording portion of the image capture unit 10 during operation of the view system 1 and is depicted on the image sensor 20.

In step S20, a reference transducer target position 51 is correspondingly defined/determined on the image sensor 20 where the reference transducer 50 is depicted in an ideal vehicle environment.

In step S30, the image capture unit captures image data of the recording portion 11 around the vehicle 60 on the image sensor 20 which comprise the reference transducer 50.

In step S40, the image read-out portion 22 read out from the image data of the image sensor 20 is shown on the reproduction unit 40.

In step S50, a reference transducer current position 52 of the reference transducer 50 is determined on the image sensor 20 and, in step S60, the reference transducer current position 52 and the reference transducer target position 51 are compared with each other to that effect whether the reference transducer current position 52 is equal to the reference transducer target position 51 or not (S70).

If the reference transducer current position 52 is equal to the reference transducer target position 51 (YES in S70), the verification process returns to step S50 and determines the reference transducer current position 52. The re-determination of the reference transducer current position 52 may either occur upon a signal, such as, for example, a manual signal by the driver or an automatically generated signal, such as upon elapse of a certain time span, or may occur directly after determination that the reference transducer current position 52 is equal to the reference transducer target position 51, without time delay, i.e., in an inquiry program loop.

If the reference transducer current position 52 is not equal to the reference transducer target position 51 (NO in S70), the process either proceeds to step S71 and outputs a signal to the driver which shows the driver the deviation of the reference transducer current position 52 relative to the reference transducer target position 51, or proceeds to step 72 in which the recording portion 11 of the camera 10 is calibrated, i.e. corrected such that the reference transducer current position 52 is equal to the reference transducer target position 51. It is also conceivable that steps S71 and S72 occur timely subsequently, i.e., firstly, that a signal is output to the driver which shows the deviation of the reference transducer current position 52 to the reference transducer target position 51 and, directly following to the output of the signal, the correction of the reference transducer current position 52 occurs such that the reference transducer current position 52 is equal to the reference transducer target position 51.

The process of FIG. 8 is terminated after step S71 and, after step S72, may either return again to step S70, in order check whether the reference transducer current position 52 is equal to the reference transducer target position 51, or may alternatively also be terminated after step S72.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for verifying an indirect view system of a vehicle, comprising:
providing (S10) at least one image capture unit which has at least one image sensor and is configured for capturing image data of at least one recording portion around the vehicle,
providing (S10) at least one image processing unit which is configured for processing the image data captured by the image capture unit,
providing (S10) at least one reproduction unit which is configured for reproducing the image data processed by the image processing unit,
providing (S10) at least one reference transducer at a defined position at the vehicle such that the reference transducer lies in a recording portion of the image capture unit and is depicted on the image sensor, wherein the reference transducer is defined at a reference transducer target position on the image sensor (S20),
capturing (S30) of image data of the at least one recording portion around the vehicle on the image sensor which comprise the reference transducer,
reproducing (S40) at least one image read-out portion read out from the image data of the image sensor on the reproduction unit,
determining (S50) a reference transducer current position of the reference transducer on the image sensor,
comparing (S60, S70) the reference transducer current position and the reference transducer target position to that extent whether the reference transducer current position is equal to the reference transducer target position or not,
wherein at least the reference transducer current position is depicted on the reproduction unit and the comparing (S60, S70) occurs on the reproduction unit,
comparing a current field of view and a target field of view by comparing certain points associated with the target field of view with points of the current field of view, and
determining whether the image capture unit is in one of an operating position, a displaced position and a fixedly defined position.

2. The method according to claim 1, wherein the indirect view system is a mirror replacement system.

3. The method according to claim 1, further comprising the step of outputting a signal to the driver, if the reference transducer current position is unequal to the reference transducer target position.

4. The method according to claim 1, further comprising the step of outputting a signal to the driver, if the reference transducer current position is unequal to the reference transducer target position.

5. The method according to claim 1, wherein the reference transducer target position has a fixed geometric relation to at least one target field of view captured by the image capture unit.

6. The method according to claim 5, wherein the target field of view is a legally prescribed field of view.

7. The method according to claim 1, further comprising the step of performing a calibration action, if the reference transducer current position is unequal to the reference transducer target position.

8. The method according to claim 7, wherein the calibration action occurs by a signal received from the image processing unit.

9. The method according to claim 7, wherein the calibration action comprises the adjustment of the recording portion of the image capture unit, such that the reference transducer current position is equal to the reference transducer target position.

10. The method according to claim 9, wherein the adjustment of the recording portion of the image capture unit occurs by aligning of at least one part of the image capture unit and/or by adapting the at least one image read-out portion on the image sensor.

11. The method according to claim 1, wherein the comparing of the reference transducer current position and the reference transducer target position occurs by the image processing unit in at least one image analysis portion of the image sensor.

12. The method according to claim 11, wherein the image read-out portion comprises the image analysis portion.

13. An indirect view system of a vehicle which is configured for performing the method according to claim 1, the system comprising:
- the at least one image capture unit, which comprises an image sensor and which is configured for capturing image data of at least one recording portion around the vehicle,
- the at least one image processing unit which is configured for processing the image data captured by the image capture unit,
- the at least one reproduction unit which is configured for reproducing the image data processed by the image processing unit,
- the at least one reference transducer which is configured such that it is attachable to a defined position at the vehicle and, in a state of the indirect view system mounted on the vehicle, lies in a recording portion of the image capture unit and is depicted on the image sensor, wherein the reference transducer is depicted on the reference transducer target position on the image sensor, and
- at least one verification unit which is configured for performing steps (S50) to (S70), for comparing a current field of view and a target field of view by comparing certain points associated with the target field of view with points of the current field of view, and for determining whether the image capture unit is in one of an operating position, displaced from the operating position and a fixedly defined position.

14. The indirect view system according to claim 13, wherein the reference transducer comprises a geometric pattern.

15. The indirect view system according to claim 13, wherein the reference transducer reflects light.

16. The indirect view system according to claim 13, further comprising at least two capture units, wherein a reference transducer is respectively associated with each capture unit or wherein a common reference transducer is associated to the capture units.

17. The indirect view system according to claim 13, wherein the view system is a mirror replacement system.

18. The indirect view system according to claim 13, wherein the view system
- further comprises a calibration unit which is configured for performing a calibration action.

19. A vehicle with an indirect view system according to claim 13, wherein the image capture unit is arranged in a supporting element which extends distally from the vehicle.

20. The vehicle according to claim 19, wherein the reference transducer is attached at an outer side of the vehicle driver's cabin.

21. The vehicle according to claim 19, wherein the reference transducer is attached to a side surface of the vehicle.

22. The vehicle according to claim 19, wherein the vehicle is a commercial vehicle and the reference transducer is attached to a front surface of the vehicle.

23. The vehicle according to claim 19, wherein the reference transducer is attached to a vehicle built-up of the vehicle.

24. The vehicle according to claim 19, wherein the reference transducer is attached via a reference transducer supporting element to the vehicle.

25. The vehicle according to claim 19, wherein the reference transducer is releasably connected to the vehicle.

26. A method for verifying an indirect view system of a vehicle, comprising:
- providing at least one image capture unit which has at least one image sensor and is configured for capturing image data of at least one recording portion around the vehicle,
- providing at least one image processing unit which is configured for processing the image data captured by the image capture unit,
- providing at least one reproduction unit which is configured for reproducing the image data processed by the image processing unit,
- providing at least one reference transducer at a defined position at the vehicle such that the reference transducer lies in the recording portion of the image capture unit and is depicted on the image sensor, wherein the reference transducer is defined at a reference transducer target position on the image sensor,
- capturing of image data of the at least one recording portion around the vehicle on the image sensor which comprise the reference transducer,
- reproducing at least one image read-out portion read out from the image data of the image sensor on the reproduction unit,
- determining a reference transducer current position of the reference transducer on the image sensor,
- comparing the reference transducer current position and the reference transducer target position to that extent whether the reference transducer current position is equal to the reference transducer target position or not,
- wherein the comparing of the reference transducer current position and the reference transducer target position by processing unit in at least one image analysis portion of the image sensor, wherein the image read-out portion does not comprise the image analysis portion.

27. A method for verifying an indirect view system of a vehicle, comprising:
- providing at least one image capture unit which has at least one image sensor and is configured for capturing image data of at least one recording portion around the vehicle,
- providing at least one image processing unit which is configured for processing the image data captured by the image capture unit,
- providing at least one reproduction unit which is configured for reproducing the image data processed by the image processing unit,
- providing at least one reference transducer at a defined position at the vehicle such that the reference transducer lies in the recording portion of the image capture unit and is depicted on the image sensor, wherein the reference transducer is defined at a reference transducer target position on the image sensor,
- capturing of image data of the at least one recording portion around the vehicle on the image sensor which comprise the reference transducer,
- reproducing at least one image read-out portion read out from the image data of the image sensor on the reproduction unit,
- determining a reference transducer current position of the reference transducer on the image sensor, and
- comparing the reference transducer current position and the reference transducer target position to that extent whether the reference transducer current position is equal to the reference transducer target position or not,
- wherein at least the reference transducer current position is depicted on the reproduction unit and the comparing occurs on the reproduction unit and is performed by a user of the indirect view system by manually applying a verification unit, the verification unit being a foil.

28. The indirect view system according to claim 13, wherein the reference transducer is a light source.

29. The indirect view system according to claim 28, wherein the light source is a lamp which exists at the vehicle.

30. The indirect view system according to claim 28, wherein the light source is configured for indicating a pollution of the optics of the image capture unit on the reproduction unit.

* * * * *